US012502751B2

(12) United States Patent
Jauregui

(10) Patent No.: US 12,502,751 B2
(45) Date of Patent: Dec. 23, 2025

(54) VALVE INSTALLATION AND REMOVAL DEVICE AND METHOD OF USE

(71) Applicant: Jorge Jauregui, Los Angeles, CA (US)

(72) Inventor: Jorge Jauregui, Los Angeles, CA (US)

( * ) Notice: Subject to any disclaimer, the term of this patent is extended or adjusted under 35 U.S.C. 154(b) by 463 days.

(21) Appl. No.: 18/082,222

(22) Filed: Dec. 15, 2022

(65) Prior Publication Data

US 2024/0198497 A1 Jun. 20, 2024

(51) Int. Cl.

*B25B 13/50* (2006.01)
*B25B 13/06* (2006.01)
*B25B 13/46* (2006.01)
*B25B 13/48* (2006.01)

(52) U.S. Cl.

CPC .......... *B25B 13/5033* (2013.01); *B25B 13/06* (2013.01); *B25B 13/46* (2013.01); *B25B 13/481* (2013.01)

(58) Field of Classification Search

CPC ... B25B 13/5033; B25B 13/06; B25B 13/065; B25B 13/46; B25B 13/48; B25B 13/481; B25B 33/00; B23P 19/04
USPC ........................................................ 81/124.4
See application file for complete search history.

(56) References Cited

U.S. PATENT DOCUMENTS 1,289,558 A * 12/1918 Sedgley .................. B25B 13/56 81/124.5
1,360,121 A * 11/1920 Lawrence ............... B25B 13/06 81/124.4
1,416,461 A * 5/1922 Hance ........................ B25F 1/02 81/177.85
1,724,491 A * 8/1929 Mandl .................... B25G 1/005 81/177.85
1,930,238 A * 10/1933 Courvoisier ............ B25B 13/06 411/403
3,175,435 A * 3/1965 Pollack ................. B25B 13/481 81/124.2
4,716,610 A * 1/1988 Therkildsen ............ B25B 13/48 7/138
4,894,879 A * 1/1990 Therkildsen ............ B25B 27/24 7/138
5,005,451 A * 4/1991 Lee ........................... B25B 9/00 81/487
6,167,604 B1 1/2001 Del Bono
6,260,452 B1 * 7/2001 Yu .......................... B25G 1/043 81/177.85

(Continued)

FOREIGN PATENT DOCUMENTS

WO WO2015131227 9/2015

*Primary Examiner* — David B. Thomas

(57) ABSTRACT

A valve installation and removal device for preventing rotation of a valve while installing or removing the valve includes a tube, which is internally threaded so as to be threadedly attachable to an outlet connector of a valve assembly. The valve assembly has a compression fitting that is nonlinear with the outlet connector. A pair of openings is opposingly positioned in the tube substantially equally distant from opposed ends of the tube. A drive is attached to and extends substantially perpendicularly from an elongate handle proximate to a first end of the elongate handle. The drive is complementary to, and thus selectively insertable through, the openings, which are noncircular, to engage the elongate handle to the tube. The elongate handle can be grasped in a hand of a user to prevent rotation of the valve assembly as a nut of the compression fitting tightened or loosened.

8 Claims, 8 Drawing Sheets

(56) References Cited

U.S. PATENT DOCUMENTS

| | | | | |
|---|---|---|---|---|
| 6,382,060 | B1 * | 5/2002 | Eichinger | B25B 33/00 81/488 |
| 6,523,440 | B2 * | 2/2003 | Friedman | B25B 13/04 81/186 |
| D530,167 | S | 10/2006 | Tripp, Jr. | |
| 7,114,418 | B1 * | 10/2006 | Allen | B25B 13/48 81/439 |
| 7,163,028 | B1 * | 1/2007 | Atkinson | F16L 55/1152 285/8 |
| 8,887,599 | B2 * | 11/2014 | Evans | B25B 13/48 81/177.2 |
| 9,770,812 | B2 | 9/2017 | Jefferson | |
| 10,220,502 | B2 * | 3/2019 | Bradley | B25G 1/085 |
| 10,946,501 | B2 | 3/2021 | Patil | |
| D972,908 | S * | 12/2022 | Huang | D8/21 |
| 11,518,011 | B2 * | 12/2022 | Klampfl | B25G 1/08 |
| 2012/0060654 | A1 | 3/2012 | Swanson | |
| 2015/0135912 | A1 * | 5/2015 | Ma | B25B 13/06 81/437 |
| 2021/0046622 | A1 * | 2/2021 | Li | B25B 23/0035 |
| 2023/0202016 | A1 * | 6/2023 | Ichikawa | B25B 7/08 81/436 |

* cited by examiner

VALVE INSTALLATION AND REMOVAL DEVICE AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to angle fixing wrenches and more particularly pertains to a new angle fixing wrench for preventing rotation of a valve while installing or removing the valve. The present invention discloses an angle fixing wrench that has a handle with is selectively positionable relative to a wrench being used to tighten or loosen a nut of a compression fitting.

(2) Description of Related Art Including Information Disclosed Under 37 CFR 1.97 and 1.98

The prior art relates to angle fixing wrenches, which may comprise housings that fit over valve assemblies and which have handles extending therefrom which are parallel planarly with wrenches being used to tighten nuts of compression fittings of the valve assemblies. What is lacking in the prior art is an angle fixing wrench comprising a handle to which a drive is attached, and a threaded tube that attached to an outlet port of a valve assembly. The drive is selectively engageable to the tube, at an angle that is selectable by a user. The handle thus can be positioned so as not to interfere with a wrench being used to tighten a nut of a compression fitting of the valve assembly.

BRIEF SUMMARY OF THE INVENTION

An embodiment of the disclosure meets the needs presented above by generally comprising a tube, which is internally threaded so as to be complementary to an outlet connector of a valve assembly. The valve assembly has a compression fitting that is nonlinear with the outlet connector. The tube is configured for threaded attachment to the outlet connector. The openings of a pair of openings are opposingly positioned in the tube substantially equally distant from opposed ends of the tube. A drive is attached to and extends substantially perpendicularly from an elongate handle proximate to a first end of the elongate handle. The drive is complementary to, and thus selectively insertable through, the openings, which are noncircular, to engage the elongate handle to the tube. The elongate handle is configured to be grasped in a hand of a user to prevent rotation of the valve assembly as a nut of the compression fitting tightened or loosened. Tightening of the nut is done with a wrench and fixedly attaches the valve assembly to a pipe by compressing a flange onto the pipe.

Another embodiment of the disclosure includes a method of installing a valve assembly. A valve assembly, as discussed above, a wrench, and a valve installation and removal device, according to the disclosure above, are provided for the method. Installation steps of the method entail threading the tube onto the outlet connector, positioning the compression fitting onto a pipe, inserting the drive through the pair of openings so that the handle is readily accessible, inserting the nut of the compression fitting into the wrench, grasping the handle to prevent rotation of the valve assembly, and rotating the wrench to tighten the nut so that a flange within the nut is compressed between the nut and the pipe to attach the valve assembly to the pipe. Removal of a valve can be accomplished by loosening the nut rather than tightening the nut.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
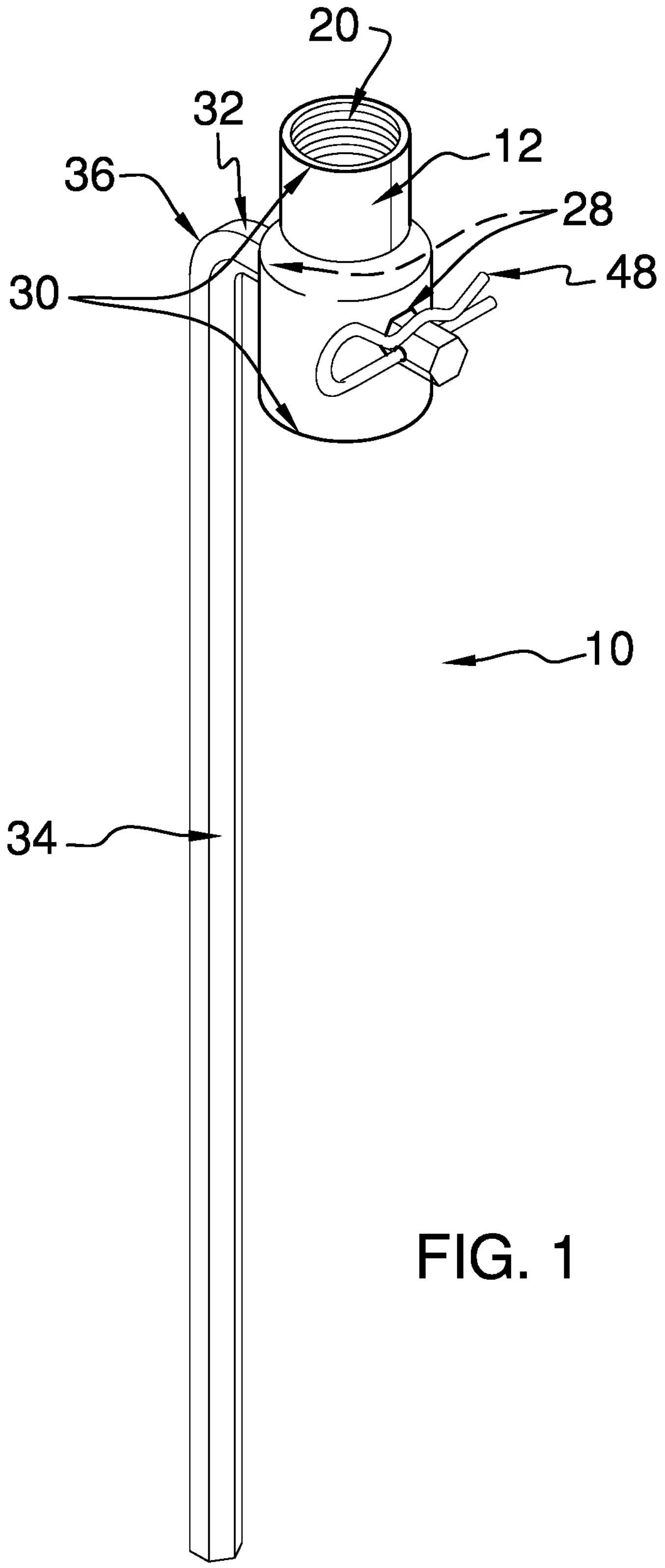
FIG. 1 is an isometric perspective view of a valve installation and removal device according to an embodiment of the disclosure.
Figure 2:
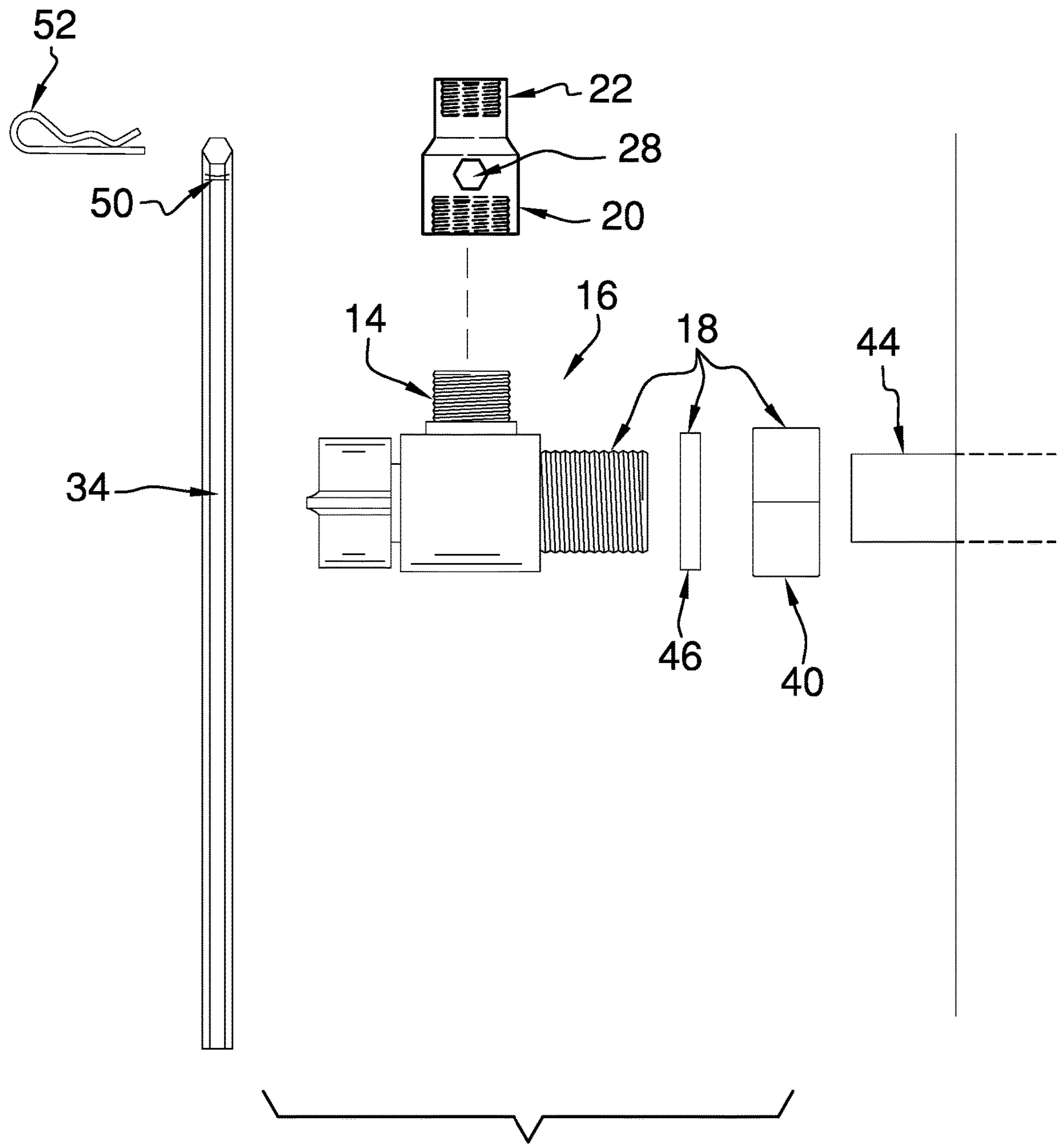
FIG. 2 is a front exploded view of an embodiment of the disclosure.

With reference now to the drawings, and in particular to FIGS. 1 through 8 thereof, a new angle fixing wrench embodying the principles and concepts of an embodiment of the disclosure and generally designated by the reference numeral 10 will be described.

As best illustrated in FIGS. 1 through 8, the valve installation and removal device 10 generally comprises a tube 12, which is internally threaded so as to be complementary to an outlet connector 14 of a valve assembly 16. The valve assembly 16 has a compression fitting 18 that is nonlinear with the outlet connector 14. The valve assembly 16 may have more than one outlet connector 14 and/or more than one compression fitting 18, but each compression fitting 18 must be nonlinear relative to at least one outlet connector 14. The tube 12 is configured for threaded attachment to the outlet connector 14.

The tube 12 may comprise a first segment 20 and a second segment 22, with the first segment 20 having an associated internal diameter 24 that is larger than and that of the second segment 22. As such, the first segment 20 is complementary to an outlet connector 14 having a first diameter and the second segment 22 is complementary to an outlet connector 14 having a second diameter. For example, the first segment 20 may be complementary to a ½" outlet connector 14 and the second segment 22 may be complementary to a ⅜" outlet connector 14.

Figure 5:
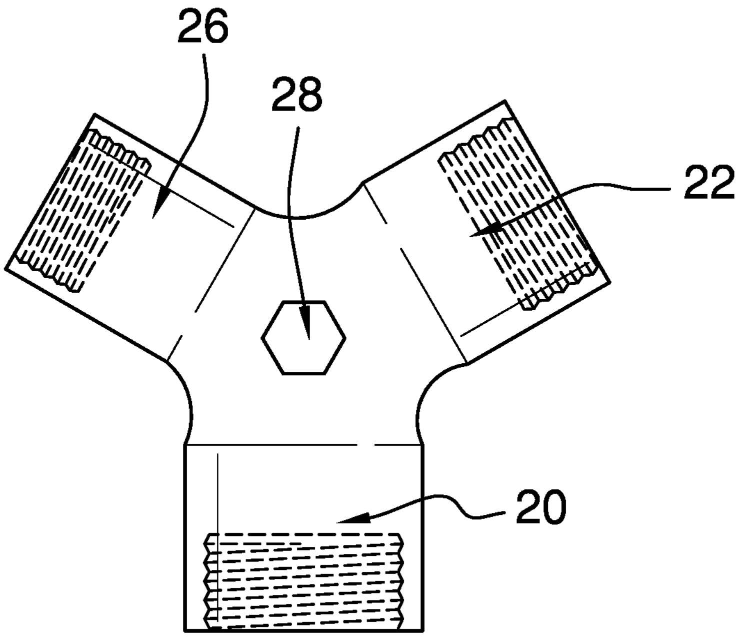
FIG. 5 is a front view of an embodiment of the disclosure.

As shown in FIG. 5, the tube 12 also may comprise a third segment 26 so that the tube 12 is Y-shaped. The third segment 26 has an associated internal diameter 24 smaller than that of the second segment 22 so that the third segment 26 is complementary to an outlet connector 14 having a third diameter. For example, the first segment 20 may be complementary to a ½" outlet connector 14, the second segment 22 may be complementary to a ⅜" outlet connector 14, and the third segment 26 may be complementary to a ¾" outlet connector 14.

The openings 28 of a pair of openings 28 are opposingly positioned in the tube 12 substantially equally distant from opposed ends 30 of the tube 12. The openings 28, which are noncircular, may be hexagonal, square, or the like.

Figure 3:
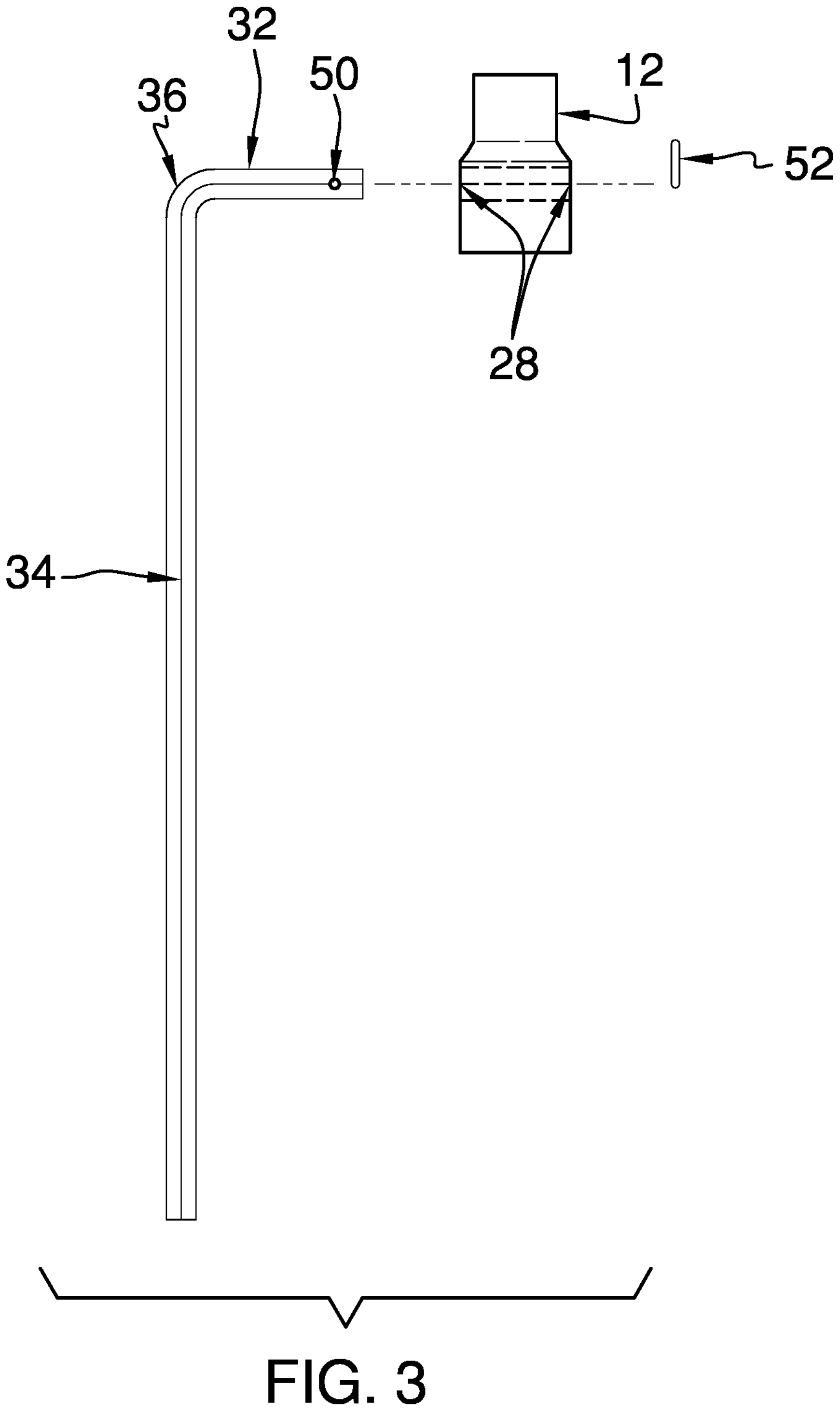
FIG. 3 is a side exploded view of an embodiment of the disclosure.
Figure 7:
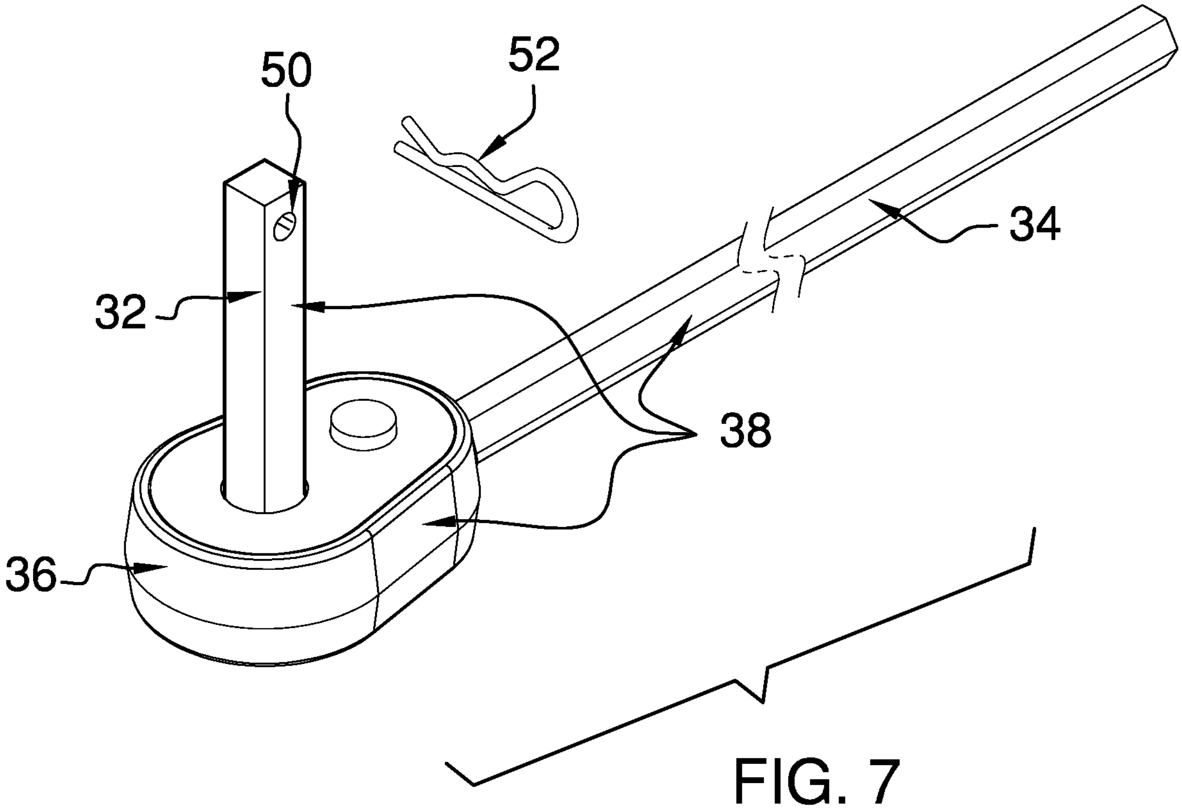
FIG. 7 is an isometric perspective view of an embodiment of the disclosure.
Figure 8:
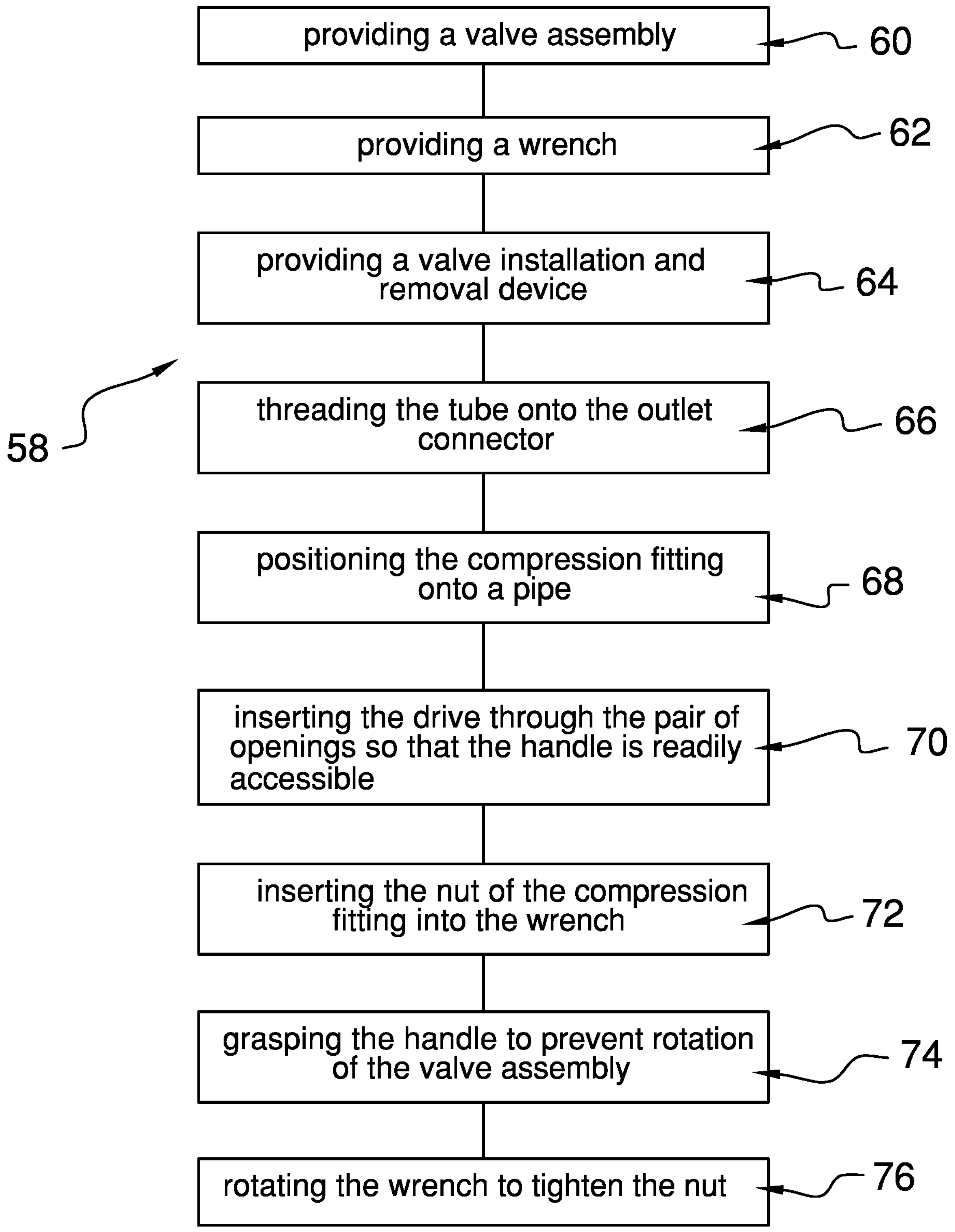
FIG. 8 is a flow diagram for a method utilizing an embodiment of the disclosure.

As shown in FIG. 3, a drive 32 is attached to and extends substantially perpendicularly from an elongate handle 34 proximate to a first end 36 of the elongate handle 34. The drive 32 is complementary to, and thus selectively insertable through, the openings 28 to engage the elongate handle 34 to the tube 12. As shown in FIG. 7, the elongate handle 34 and the drive 32 together comprise a ratcheting wrench 38.

Figure 4:
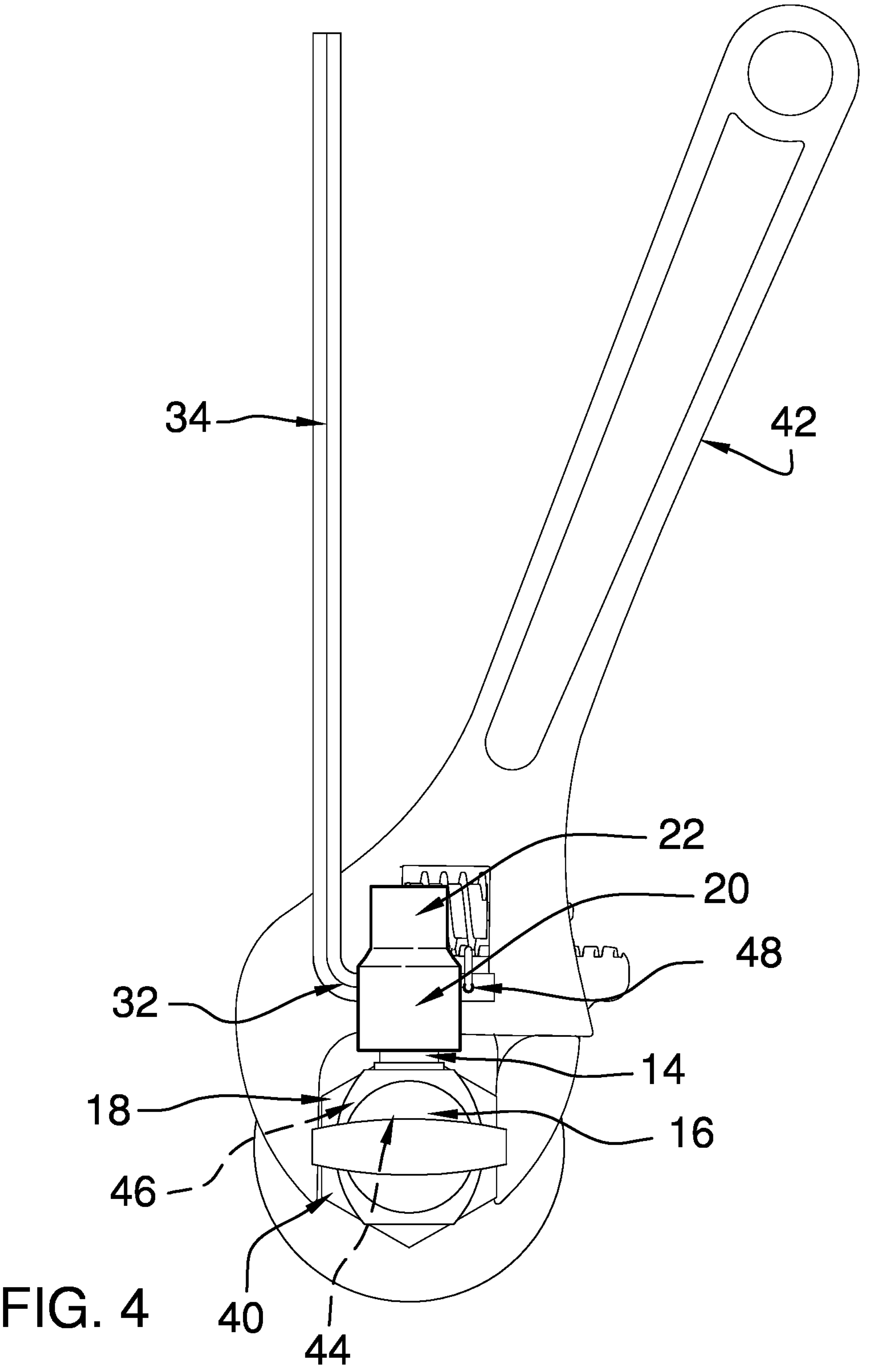
FIG. 4 is an in-use view of an embodiment of the disclosure.

The elongate handle 34 is configured to be grasped in a hand of a user to prevent rotation of the valve assembly 16 as a nut 40 of the compression fitting 18 is tightened or loosened. Tightening of the nut 40 is done with a wrench 42 and fixedly attaches the valve assembly 16 to a pipe 44 by compressing a flange 46 onto the pipe 44, as shown in FIG. 4. Such valve assemblies are often positioned in hard to reach places, such as in cabinets or behind toilets. When they require replacement, it is difficult to operate both the wrench 42 required for tightening the nut 40 and prior art angle fixing devices, which typically extend from the valve assembly 16 parallel planarly with, and in close proximity to, the wrench 42. As the drive 32 can be selectively inserted into the pair of openings 28 such that it extends from the valve assembly 16 angularly relative to the wrench 42, these issues are overcome.

Figure 6:
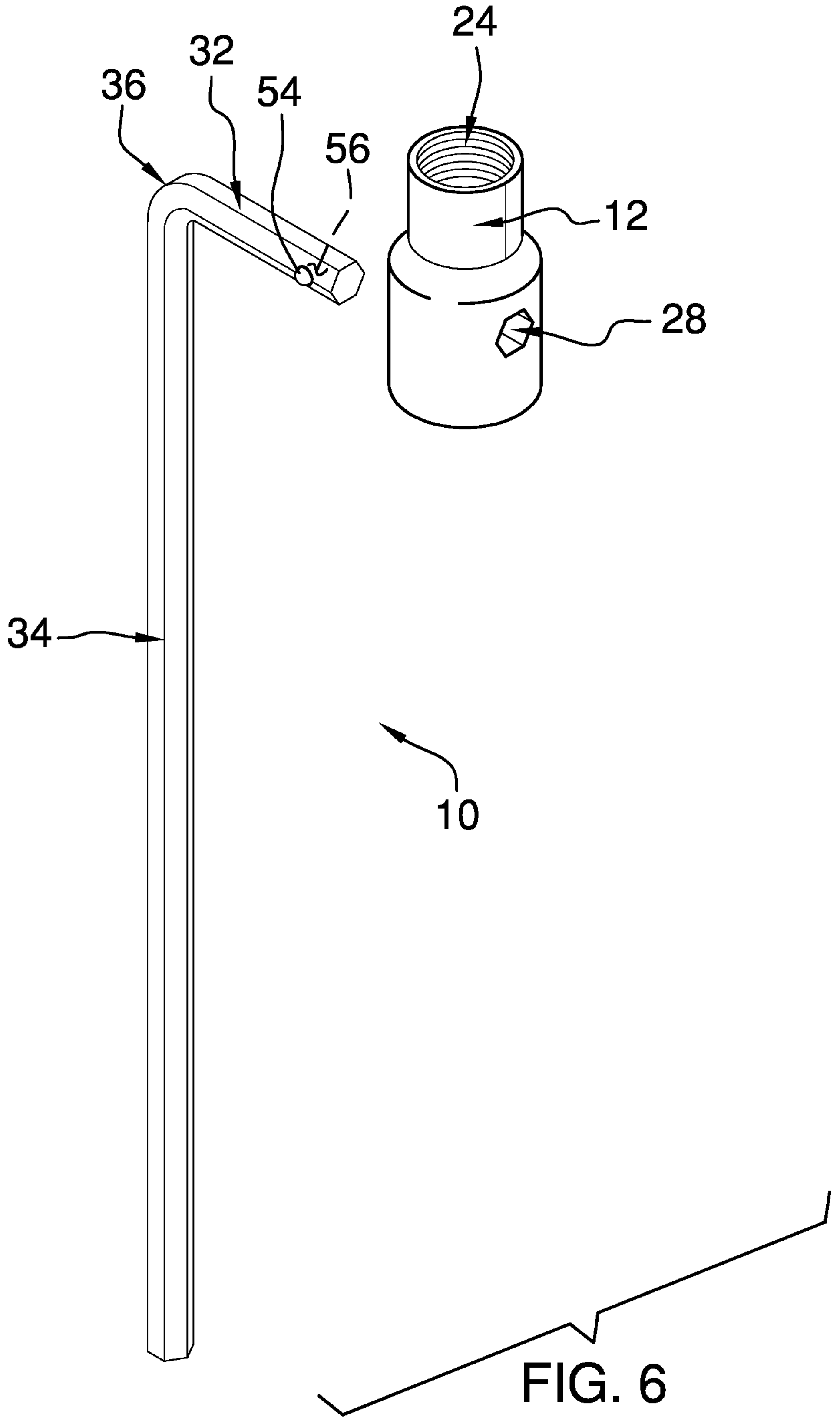
FIG. 6 is an isometric perspective view of an embodiment of the disclosure.

The valve installation and removal device 10 also may comprise a fastener 48, which is attached to the drive 32 distal from the elongate handle 34. The fastener 48 is positioned to engage the tube 12 upon insertion of the drive 32 through the pair of openings 28 to prevent inadvertent extraction of the drive 32 from the pair of openings 28, as may occur when working in tight spaces or when the valve assembly 16 is positioned overhead. As shown in FIGS. 1-4, the fastener 48 comprises a channel 50, which is positioned through the drive 32, and a pin 52, which is selectively positionable through the channel 50. As shown in FIG. 6, the fastener 48 comprises a button 54, which is attached to the drive 32 and which is positioned in a recess 56 in the drive 32. The button 54 is spring loaded so that the button 54 is biased to an extended configuration.

The valve installation and removal device 10 enables a method of installing a valve assembly 58. The method 58 comprises a first provision step 60 entailing providing a valve assembly 16 having a compression fitting 18 that is nonlinear with an outlet connector 14 of the valve assembly 16. A second provision step 62 of the method 58 is providing a wrench 42 complementary to a nut 40 of the compression fitting 18. A third provision step 64 of the method 58 is providing a valve installation and removal device 10, according to the specification above.

A first installation step 66 of the method 58 is threading the tube 12 onto the outlet connector 14. A second installation step 68 of the method 58 is positioning the compression fitting 18 onto a pipe 44. A third installation step 70 of the method 58 is inserting the drive 32 through the pair of openings 28 so that the handle is readily accessible. A fourth installation step 72 of the method 58 is inserting the nut 40 of the compression fitting 18 into the wrench 42. A fifth installation step 74 of the method 58 is grasping the handle to prevent rotation of the valve assembly 16. A sixth installation step 76 of the method 58 is rotating the wrench 42 to tighten the nut 40 so that a flange 46 within the nut 40 is compressed between the nut 40 and the pipe 44 to attach the valve assembly 16 to the pipe 44. As will be obvious to one skilled in the art of pipe fittings, removal of a valve assembly 16 can be accomplished by loosening the nut 40 rather than tightening the nut 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A valve installation and removal device comprising:

a tube, the tube being internally threaded, such that the tube is complementary to an outlet connector of a valve assembly having a compression fitting that is nonlinear with the outlet connector, wherein the tube is configured for threaded attachment to the outlet connector, the tube comprising a first segment, a second segment, and a third segment such that the tube is Y-shaped, the first segment having an associated internal diameter larger than and that of the second segment, such that the first segment is complementary to an outlet connector having a first diameter and the second segment is complementary to an outlet connector having a second diameter, the third segment having an associated internal diameter smaller than that of the second segment, such that the third segment is complementary to an outlet connector having a third diameter;

a pair of openings, the openings being opposingly positioned in the tube substantially equally distant from opposed ends of the tube, the openings being noncircular;

an elongate handle; and a drive attached to the elongate handle proximate to a first end of the elongate handle and extending substantially perpendicularly from the elongate handle, the drive being complementary to the pair of openings, such that the drive is selectively insertable through the pair of openings for engaging the elongate handle to the tube, wherein the elongate handle is configured for grasping in a hand of a user for preventing rotation of the valve assembly as a nut of the compression fitting is tightened or loosened.

2. The valve installation and removal device of claim 1, wherein the openings are hexagonal or square.

3. The valve installation and removal device of claim 1, wherein the elongate handle and the drive together comprise a ratcheting wrench.

4. The valve installation and removal device of claim 1, further including a fastener attached to the drive distal from the elongate handle, such that the fastener is positioned for engaging the tube upon insertion of the drive through the pair of openings for preventing inadvertent extraction of the drive from the pair of openings.

5. The valve installation and removal device of claim 4, wherein the fastener comprises:

a channel positioned through the drive, and a pin selectively positionable through the channel, or a button attached to the drive and positioned in a recess in the drive, the button being spring loaded, such that the button is biased to an extended configuration.

6. A valve installation and removal device comprising:

a tube, the tube being internally threaded, such that the tube is complementary to an outlet connector of a valve assembly having a compression fitting that is nonlinear with the outlet connector, wherein the tube is configured for threaded attachment to the outlet connector, the tube comprising a first segment, a second segment, and a third segment such that the tube is Y-shaped, the first segment having an associated internal diameter larger than and that of the second segment, such that the first segment is complementary to an outlet connector having a first diameter and the second segment is complementary to an outlet connector having a second diameter, the third segment having an associated internal diameter smaller than that of the second segment, such that the third segment is complementary to an outlet connector having a third diameter;

a pair of openings, the openings being opposingly positioned in the tube substantially equally distant from opposed ends of the tube, the openings being noncircular, the openings being hexagonal or square;

an elongate handle;

a drive attached to the elongate handle proximate to a first end of the elongate handle and extending substantially perpendicularly from the elongate handle, the drive being complementary to the pair of openings, such that the drive is selectively insertable through the pair of openings for engaging the elongate handle to the tube, wherein the elongate handle is configured for grasping in a hand of a user for preventing rotation of the valve assembly as a nut of the compression fitting is tightened or loosened; and a fastener attached to the drive distal from the elongate handle, such that the fastener is positioned for engaging the tube upon insertion of the drive through the pair of openings for preventing inadvertent extraction of the drive from the pair of openings, the fastener comprising:

a channel positioned through the drive, and a pin selectively positionable through the channel, or a button attached to the drive and positioned in a recess in the drive, the button being spring loaded, such that the button is biased to an extended configuration.

7. The valve installation and removal device of claim 6, wherein the elongate handle and the drive together comprise a ratcheting wrench.

8. A method of installing a valve assembly comprising the steps of:

providing a valve assembly having a compression fitting that is nonlinear with an outlet connector of the valve assembly;

providing a wrench complementary to a nut of the compression fitting;

providing a valve installation and removal device comprising:

a tube, the tube being internally threaded, such that the tube is complementary to an outlet connector of a valve assembly having a compression fitting that is nonlinear with the outlet connector, a pair of openings, the openings being opposingly positioned in the tube substantially equally distant from opposed ends of the tube, the openings being noncircular, an elongate handle, and a drive attached to the elongate handle proximate to a first end of the elongate handle and extending substantially perpendicularly from the elongate handle, the drive being complementary to the pair of openings, such that the drive is selectively insertable through the pair of openings for engaging the elongate handle to the tube, wherein the elongate handle is configured for grasping in a hand of a user for preventing rotation of the valve assembly as a nut of the compression fitting is tightened or loosened;

threading the tube onto the outlet connector;

positioning the compression fitting onto a pipe;

inserting the drive through the pair of openings so that the handle is readily accessible;

inserting the nut of the compression fitting into the wrench;

grasping the handle to prevent rotation of the valve assembly; and rotating the wrench to tighten the nut, such that a flange within the nut is compressed between the nut and the pipe to attach the valve assembly to the pipe.

* * * * *